United States Patent
Kim et al.

(10) Patent No.: US 9,567,680 B2
(45) Date of Patent: Feb. 14, 2017

(54) COMPOSITE PROTECTIVE LAYER FOR PHOTOELECTRODE STRUCTURE, PHOTOELECTRODE STRUCTURE INCLUDING THE COMPOSITE PROTECTIVE LAYER, AND PHOTOELECTROCHEMICAL CELL INCLUDING PHOTOELECTRODE STRUCTURE

(71) Applicant: Samsung Electronics Co., Ltd., Suwon-si, Gyeonggi-do (KR)

(72) Inventors: Tae-gon Kim, Hwaseong-si (KR); Jeong-hee Lee, Seongnam-si (KR); Seoung-jae Im, Seoul (KR); Tae-hyung Kim, Seoul (KR)

(73) Assignee: SAMSUNG ELECTRONICS CO., LTD., Gyeonggi-Do (KR)

(*) Notice: Subject to any disclaimer, the term of this patent is extended or adjusted under 35 U.S.C. 154(b) by 71 days.

(21) Appl. No.: 14/143,271

(22) Filed: Dec. 30, 2013

(65) Prior Publication Data
US 2014/0209456 A1  Jul. 31, 2014

(30) Foreign Application Priority Data
Jan. 29, 2013  (KR) .................. 10-2013-0010097

(51) Int. Cl.
C25B 11/04 (2006.01)
C01B 3/04 (2006.01)
C25B 1/00 (2006.01)

(52) U.S. Cl.
CPC .......... *C25B 11/0478* (2013.01); *C01B 3/042* (2013.01); *C25B 1/00* (2013.01); *C25B 1/003* (2013.01);

(Continued)

(58) Field of Classification Search
CPC .. C25B 11/0405; C25B 1/003; C25B 11/0484; C25B 11/0478; C25B 11/04; C25B 11/0442; C25B 11/0494

(Continued)

(56) References Cited

U.S. PATENT DOCUMENTS

| 4,414,080 A | 11/1983 | Williams et al. |
| 4,640,744 A | 2/1987 | Howe |

(Continued)

FOREIGN PATENT DOCUMENTS

| DE | 102009019565 A1 | 11/2010 |
| JP | 09-160077 A | 6/1997 |
| JP | 2004-097924 A | 4/2004 |

OTHER PUBLICATIONS

Fu-Ren F. Fan et al., "XXXXIX. Techniques for Stabilization of n-Silicon Electrodes in Aqueous Solution Photoelectrochemical Cells", J. Electrochem. Soc., Sep. 1981, pp. 2042-2045.
Furen F. Fan et al., "Semiconductor Electrodes. 48. Photooxidation of halides and Water on n-Silicon Protected with Silicide Layers", J. Am. Chem. Soc., vol. 105, 1983, pp. 220-224.
Nakato et al., "Photo-Electrochemical Behaviors of Semiconductor Electrodes coated with Thin Metal Films", Chemistry Letters, 1975, pp. 883-886.

(Continued)

*Primary Examiner* — Zulmariam Mendez
(74) *Attorney, Agent, or Firm* — Cantor Colburn LLP (57) ABSTRACT

A composite protective layer for a photoelectrode, the composite protective layer including a chemical protective layer; and a physical protective layer, wherein the chemical protective layer has corrosion rate of 0.1 Coulombs per square centimeter per 10 hours or less when evaluated at a water decomposition potential, and the physical protective layer has a moisture transmittance rate of 0.001 grams per square meter per day or less and has an electrical conductivity.

20 Claims, 8 Drawing Sheets

(52) U.S. Cl.
CPC .............. *Y02E 60/364* (2013.01); *Y02E 60/368* (2013.01); *Y02P 20/135* (2015.11); *Y10T 428/12611* (2015.01); *Y10T 428/12819* (2015.01)

(58) Field of Classification Search
USPC ......... 204/248, 280, 290.01, 290.08, 290.12, 204/290.14
See application file for complete search history.

(56) References Cited

U.S. PATENT DOCUMENTS

| | | | |
|---|---|---|---|
| 4,656,103 | A | 4/1987 | Reichman et al. |
| 6,878,666 | B2 | 4/2005 | Domen et al. |
| 7,052,587 | B2 | 5/2006 | Gibson et al. |
| 7,867,814 | B2 | 1/2011 | Nihei et al. |
| 8,148,188 | B2 | 4/2012 | Vereechen et al. |
| 2004/0262154 | A1 | 12/2004 | Gibson et al. |
| 2010/0101955 | A1 | 4/2010 | Nocera et al. |
| 2011/0048525 | A1* | 3/2011 | Yoneya ............... H01G 9/2022 136/256 |
| 2011/0048962 | A1 | 3/2011 | Reece et al. |
| 2013/0037414 | A1 | 2/2013 | Obenland et al. |

OTHER PUBLICATIONS

Paracchino et al., "Highly active oxide photocathode for photoelectrochemical water reduction", Nature Materials, vol. 10, Jun. 2011, pp. 456-461.

Skoteim et al., "Stabilization of n-Si Photoanodes to Surface Corrosion in Aqueous Electrolyte with a Thin Film of Polypyrrole", J. Electrochem. Soc., Jul. 1981, pp. 1625-1626.

Yi Wei Chen et al., "Atomic layer-deposited tunnel oxide stabilized silicon photoanodes for water oxidation", Nature Materials, vol. 10, Jul. 2011, pp. 539-544.

Seger et al., "Using TiO2 as a Conductive Protective Layer for Photocathodic H2 Evolution", J. Am. Chem. Soc., vol. 135, 2012, pp. 1057-1064.

Seger et al., "Hydrogen Production Using a Molybdenum Sulfide Catalyst on a Titanium-Protected n+p-Silicon Photocathode", Angew. Chem. Inst. Ed., vol. 51, 2012, pp. 9128-9131.

Extended European Search Report for European Patent No. 14150344.1 dated Nov. 11, 2014.

European Examination Report for European Patent Application No. 14 150 311.1 dated Jul. 24, 2015.

Neumann et al., "TiO2-Protected Photoelectrochemical Tandem Cu(In, Ga)Se2 Thin Film Membrane for Light Induced Water Splitting and Hydrogen Evolution", J. Phys. Chem.C., vol. 113, 2009, pp. 20980-20989.

* cited by examiner

COMPOSITE PROTECTIVE LAYER FOR PHOTOELECTRODE STRUCTURE, PHOTOELECTRODE STRUCTURE INCLUDING THE COMPOSITE PROTECTIVE LAYER, AND PHOTOELECTROCHEMICAL CELL INCLUDING PHOTOELECTRODE STRUCTURE

CROSS-REFERENCE TO RELATED APPLICATION

This application claims priority to and the benefit of Korean Patent Application No. 10-2013-0010097, filed on Jan. 29, 2013, and all the benefits accruing therefrom under 35 U.S.C. §119, the content of which is incorporated herein in its entirety by reference.

BACKGROUND

1. Field

The present disclosure relates to composite protective layer for a photoelectrode structure, a photoelectrode structure including the composite protective layer, and a photoelectrochemical cell ("PEC") including the photoelectrode structure.

2. Description of the Related Art

A photoelectrochemical cell ("PEC") that obtains hydrogen and oxygen through decomposition of water by using solar energy is environmentally friendly because sunlight and water are used as an energy source and a reactant, respectively.

In most conventional PECs, a photoelectrode directly contacts an aqueous electrolyte and as a result, performance of the PECs is reduced due to corrosion caused by a reaction between the photoelectrode and the aqueous electrolyte. Also, because only materials stable in the aqueous electrolyte may be used as the materials for the photoelectrode, there is a limitation in using semiconductor materials capable of exerting better photoelectric efficiency. Thus there remains a need for an improved photoelectrode material.

SUMMARY

Additional aspects will be set forth in part in the description which follows and, in part, will be apparent from the description.

Provided is a composite protective layer for a photoelectrode structure for improving a lifespan of a photoelectrode structure for decomposing water.

Provided is a photoelectrode structure including the composite protective layer.

Provided is a photoelectrochemical cell including the photoelectrode structure.

According to an aspect, there is provided a composite protective layer for a photoelectrode structure, the composite protective layer including a chemical protective layer; and a physical protective layer, wherein the chemical protective layer has a corrosion rate of 0.1 Coulombs per square centimeter per 10 hours ($C/cm^2$/10 hours) or less when evaluated at a water decomposition potential, and the physical protective layer has moisture transmittance rate of 0.001 grams per square meter per day ($g/m^2$/day) or less and has an electrical conductivity.

The electrical conductivity of the physical protective layer at room temperature may be $1 \times 10^6$ Siemens per centimeter (S/cm) or greater.

A native oxide film of the chemical protective layer may have a thickness of 10 nanometers nm or less.

According to another aspect, disclosed is a photoelectrode structure including: an electrode; a light absorbing layer; the composite protective layer; and an electrocatalyst.

A bonding layer may be further included between the light absorbing layer and the composite protective layer.

A carrier blocking layer may be further included between the light absorbing layer and the bonding layer.

The light absorbing layer and the physical protective layer of the composite protective layer may be directly bonded using laser bonding or arc melting.

The photoelectrode structure may include a structure wherein an electrode/$Cu_2O$ layer/$TiO_2$ layer/In layer/Cu foil/Ta thin film/Ta native oxide film/electrocatalyst are sequentially laminated, or a structure wherein an electrode/n-type silicon/p-type silicon/In layer/Cu foil/Ta thin film/Ta native oxide film/electrocatalyst are sequentially laminated.

According to another aspect, there is provided a photoelectrochemical cell including the photoelectrode structure.

Also disclosed is a method of manufacturing a photoelectrode, the method including: sequentially disposing an electrode, a light absorbing layer, the composite protective layer, and an electrocatalyst; and directly bonding the light absorbing layer and a physical protective layer of the composite protective layer by laser bonding or arc melting.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, an embodiment of a composite protective layer for a photoelectrode structure, a photoelectrode structure including the composite protective layer, and a photoelectrochemical cell ("PEC") including the photoelectrode structure will be disclosed in further detail.

In order to provide a water decomposition technology using sunlight or to provide an artificial photosynthesis technology, a semiconductor material that is capable of producing an electromotive force of at least 2 electron volts (eV) by absorbing sunlight, wherein electrical charges produced highly efficiently participate in a chemical reaction occurring on a surface of the photoelectrode, and that does not result in reduced efficiency and performance even after a long use in water, is needed. However, despite the fact that semiconductor materials that have been developed thus far have satisfactory electromotive force and suitable initial efficiency of conversion of electrical into chemical energy, the semiconductor materials are in need of improvement because lifespan and efficiency are not satisfactory due to photocorrosion of the photoelectrode in water.

A photocorrosion phenomenon of the photoelectrode, when a photoelectrode forming material is of the formula $M_xO_y$, will be disclosed in greater detail as follows.

In a photoanode, a chemical reaction represented by Formula 1 below occurs, and in a photocathode, a chemical reaction represented by Formula 2 below occurs.

$$M_xO_y + 2y/xh+ \longleftrightarrow xM^{(2y/x)+}_{(aq)} + y/2O_2$$

$$xM_{(s)} + yH_2O + 2yh+ \longleftrightarrow M_xO_y + 2yH^+ \qquad \text{Formula 1}$$

$$M_xO_y + 2ye- + 2yH^+_{(aq)} \longleftrightarrow xM(s) + yH_2O \text{ (photocathode in acid)}$$

$$M_xO_y + 2ye- + yH_2O \longleftrightarrow xM(s) + yOH^-_{(aq)} \text{ (photocathode in alkali)} \qquad \text{Formula 2}$$

In Formulas 1 and 2, x and y are each an integer of 1 to 10.

A photocorrosion phenomenon of the photoelectrode including $M_xO_y$ of Formulas 1 and 2 occurs when excited electrons and excited holes produced by absorbing sunlight are not used in a chemical reaction on a surface of the photoelectrode, and are instead used in a chemical change of a material of the photoelectrode. Also, water is used in the photocorrosion reactions of Formulas 1 and 2, and, while not wanting to be bound by theory, it is understood that products of these photocorrosion reactions are either hydrated ions or photoelectrode oxides.

Disclosed is a composite protective layer suitable to substantially or effectively prevent direct contact between the photoelectrode and water. While not wanting to be bound by theory, it is believed that by preventing direct contact between the photoelectrode and water, photocorrosion of the photoelectrode caused by the excited electrons and the excited holes produced by absorbing sunlight can be effectively prevented.

The composite protective layer for the photoelectrode structure according to an embodiment of the present inventive concept includes the photoelectrode structure and more for example, includes a chemical protective layer and a physical protective layer. The chemical protective layer comprises a material which is chemically stable at a water decomposition potential. The physical protective layer comprises a material which is substantially impermeable to water. The water impermeability may be due to a dense structure of the material of the physical protective layer. By having such a structure, the composite protective layer substantially or effectively prevents the photocorrosion from occurring by protecting a light absorbing layer of the photoelectrode structure from directly contacting water without interfering with a movement of electrons and holes, which are involved in the chemical reaction of the photoelectrode. The composite protective layer may be applied regardless of the type and the state of the light absorbing layer of the photoelectrode structure and may protect the photoelectrode structure in various external environments.

The chemical protective layer of the composite protective layer for the photoelectrode structure has corrosion rate of 0.1 $C/cm^2$ per 10 hours or less at water decomposition potential, and the physical protective layer has a suitable moisture transmittance rate and has sufficient conductivity for efficient electron transport.

The chemical protective layer may be formed using a material which is electrochemically stable near a water decomposition potential. Also, the chemical protective layer may be formed using a material which is stable near a proton reduction potential, e.g., a potential of 0 volts (V) vs. a reversible hydrogen electrode ("RHE"). The term "water decomposition potential" as used herein refers to an electric potential sufficient to produce oxygen by oxidizing water at pH=0 and more for example, refers to an electric potential of 1.23 V vs. RHE.

The physical protective layer substantially or effectively prevents physical contact between the light absorbing layer and water, and also has a function of a metal conductive layer for efficiently transporting electrons.

When the composite protective layer is used, a high efficiency material which would otherwise have a low lifespan may be used for a long period of time in water without substantial photocorrosion. Accordingly, many semiconductor materials that are otherwise regarded as unsuitable for use in water due to the photocorrosion, despite their excellent light absorption and carrier transporting characteristics, may be applied to water decomposition technology and artificial photosynthesis. As a result, hydrogen and oxygen may be prepared at high efficiency and at lower cost because of the improved lifespan of the photoelectrode.

The chemical protective layer has a corrosion rate of 0.1 $C/cm^2$ per 10 hours at a water decomposition potential of 1.23 V vs. RHE and a pH of about 5 to about 9, and in some embodiments, the corrosion rate may be about 0.0001 $C/cm^2$ per 10 hours to about 0.1 $C/cm^2$ per 10 hours. Hence, the chemical protective layer has excellent resistance with respect to the photocorrosion.

In some embodiments, the pH of about 5 to about 9 may be about 5.

The corrosion electrical charges of the chemical protective layer may be evaluated from an average electric current occurring every hour by soaking the chemical protective layer in water and then measuring the quantity of the electric current for 10 hours using a Potentiostat at an electric potential of 1.23 V vs. RHE. Here, the quantity of electric current used in water decomposition is excluded.

The chemical protective layer includes a material that does not dissolve, i.e., is substantially insoluble, at water decomposition potential of 1.23 V in water having a pH of about 1 to about 12.

The chemical protective layer includes at least one metal selected from Group 4, Group 5, Group 11, Group 13, and Group 14, and an alloy thereof.

The chemical protective layer may comprise at least one metal selected from tantalum (Ta), niobium (Nb), titanium (Ti), gallium (Ga), zirconium (Zr), strontium (Sn), copper (Cu), hafnium (Hf), aluminum (Al), and indium (In), and an alloy thereof, and for example, at least one metal selected from Ta, Nb, and Ti, and an alloy thereof.

In an embodiment, a thickness of the chemical protective layer may be about 1/100 to about 1/10, for example about 1/80 to about 1/15, more for example about 1/60 to about 1/20 of a thickness of the physical protective layer. When the chemical protective layer has a thickness in this range in comparison to the thickness of the physical protective layer, corrosion resistance of the photoelectrode structure is improved.

The physical protective layer may have a moisture transmittance rate of 0.001 grams per square-meter per day ($g/m^2/day$) or less, and in some embodiments, the moisture transmittance rate may be about 0.000001 $g/m^2/day$ to about 0.001 $g/m^2/day$. The physical protective layer includes a material having excellent electrical conductivity at room temperature and for example, a rolled metal foil may be included. The term "room temperature" as used herein refers to a temperature of about 20° C. to about 25° C.

The moisture transmittance may be evaluated using a water vapor permeability test device having a detection limit of 0.001 $g/m^2/day$ or less. The water vapor permeability test device may be a device driven by an electrolytic sensor in accordance with ISO 15106-3.

The electrical conductivity of the physical protective layer at room temperature may be $1 \times 10^6$ Siemens per centimeter (S/cm) or greater, and in some embodiments the electrical conductivity may be about $1 \times 10^6$ S/cm to about $1 \times 10^8$ S/cm. The electrical conductivity may be obtained by using a four-point probe, a multi-tester, or a slope of a current-voltage (I-V) line.

Any material may be used as a material for forming the physical protective layer as long as the material satisfies the moisture transmittance and electrical conductivity described above. In an embodiment, the material may be at least one selected from a metal, a carbon-based material, an oxide conductor, and an inorganic material-polymer composite conductor.

The metal includes at least one metal selected from Group 5, Group 11, and Group 13, an alloy thereof, and stainless steel.

Non-limiting examples of the metal include aluminum (Al), copper (Cu), stainless steel, tantalum (Ta), niobium (Nb), and titanium (Ti), an alloy thereof, and stainless steel.

The carbon-based material includes at least one selected from amorphous carbon, graphite, and graphene, and the oxide conductor includes at least one selected from $In_2O_3$:Sn, $SnO_2$:F, ZnO:Al, $TiO_2$:Nb, and $SrTiO_3$:Nb.

According to an embodiment, the physical protective layer may be used by rolling the materials described above and then preparing a free standing foil or a free standing film.

According to an aspect, a metal foil or a hole-less metal thin film may be used as the physical protective layer, as described above. The metal foil or the metal thin film may have a very dense structure such that there is almost no portion where water or moisture may penetrate, and the metal foil or the metal thin film has characteristics of the metal conductive layer for efficiently transporting electrons. Accordingly, the metal foil or the metal thin film is suitable for use as the physical protective layer.

A thickness of the physical protective layer may be about 1 micrometer μm to about 100 μm.

In some embodiments, a thickness of the chemical protective layer may be about $1/100$ to about $1/10$, for example about $1/80$ to about $1/15$, more for example about $1/60$ to about $1/20$ of a thickness of the physical protective layer.

When the chemical protective layer and the physical protective layer have thicknesses in these ranges, the chemical protective layer and the physical protective layer effectively prevent the moisture from penetrating the light absorbing layer and as a result, the chemical protective layer and the physical protective layer can substantially or effectively prevent photocorrosion of the photoelectrode structure.

The chemical protective layer and the physical protective layer may be surface treated or may have a nano-patterned structure, and may be in the form of a nano-wire or a nanotube. When the surface treated or nano-patterned chemical protective layer and physical protective layer are used, the chemical protective layer and the physical protective layer may contribute to a high photoelectric current by enlarging a reaction area of the photoelectrode structure.

A surface treatment includes, for example, lithography, ion-beam radiation, chemical etching, or the like.

A native oxide film of the chemical protective layer of the composite protective layer for the photoelectrode structure may be formed as a thin film having a thickness of 10 nanometers (nm) or less, and in an embodiment, a thickness of about 0.5 nm to about 10 nm. When the thickness of the native oxide film is within these ranges, conductivity of the photoelectrode structure is improved and suppression the photocorrosion of the light absorbing layer may be improved.

In greater detail, when the chemical protective layer includes one selected from Ta, Nb, and Ti, and when the chemical protective layer is externally damaged, a native oxide film of Ta, Nb, or Ti may be formed as a thin film of 10 nm or less, and as a result, a self-healing ability of the chemical protective layer may be excellent.

In an embodiment, the chemical protective layer and the physical protective layer may comprise the same material as each other. For example, when the chemical protective layer and the physical protective layer both include Ta, the composite protective layer may be easily prepared by preparing a single Ta layer, wherein the Ta layer is a Ta foil.

By using the composite protective layer for the photoelectrode structure, materials such as $Cu_2O$, a sulfide, and a selenide-based material that have weak oxidation and reduction reactions may be used for the light absorbing layer.

The composite protective layer may be used as a protective layer for improving the lifespan of the photoelectrode structure for water decomposition using sunlight. Also, the composite protective layer may be used as a protective layer for a rear surface of a solar battery in extreme environments of high temperature and humidity. A light absorbing layer of the solar battery may include, for example, Si, copper-indium-gallium-selenide ("GIGS"), CdTe, or amorphous silicon.

The composite protective layer may include a Cu foil and a Ta thin film or may have a structure including the Cu foil, the Ta thin film, and a native oxide film of the Ta thin film.

According to another aspect, there is provided a photoelectrode structure including an electrode, a light absorbing layer, a composite protective layer, and an electrocatalyst.

The photoelectrode structure includes, for example, a sequentially laminated structure of an electrode/a $Cu_2O$ layer/a $TiO_2$ layer/an In layer/a Cu foil/a Ta thin film/a native oxide film of Ta/an electrocatalyst, or a sequentially laminated structure of an electrode/n-type silicon/p-type silicon/an In layer/a Cu foil/a Ta thin film/a native oxide film of Ta/an electrocatalyst.

Figure 1A:
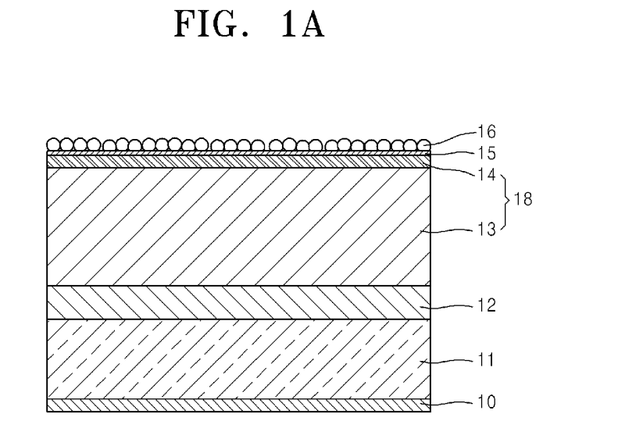
FIG. 1A is a cross-sectional view of an embodiment of a photoelectrode.

FIG. 1A is a cross-sectional view of an embodiment of a photoelectrode structure.

In FIG. 1A, a light absorbing layer 11 is disposed on an electrode 10 and a composite protective layer 18 including a physical protective layer 13 and a chemical protective layer 14 for preventing photocorrosion of the light absorbing layer 11 is laminated on the light absorbing layer 11. A bonding layer 12 is formed between the light absorbing layer 11 and the composite protective layer 18.

On the chemical protective layer 14 of the composite protective layer 18, a native oxide film 15 of the chemical protective layer 14 may be present in the form of a thin film having a thickness of 10 nm or less. The native oxide film 15 is shown in FIG. 1A; however, the native oxide film 15 may be omitted depending on a material used for the chemical protective layer 14.

If the native oxide film is present, an electrocatalyst 16 may be disposed on the native oxide film 15 of the chemical protective layer 14. Alternatively, the electrocatalyst 16 may be disposed directly on the chemical protective layer 14.

The electrocatalyst 16 decreases an activation energy of a chemical reaction when excited electrons and excited holes produced in the photoelectrode participate in the chemical reaction.

The electrocatalyst 16 may be a continuous or a discontinuous coating film or may be an electrocatalyst particle. In FIG. 1A, the electrocatalyst 16 is shown as a film.

The electrocatalyst 16 includes, for example, at least one selected from platinum (Pt), palladium (Pd), rhodium (Rh), ruthenium (Ru), iridium (Ir), nickel molybdenum (e.g., NiMo), nickel molybdenum zinc (e.g., NiMoZn), nickel molybdenum nitride (e.g., $NiMoN_x$, $0.1 \leq x \leq 2$), molybdenum sulfide (e.g., $MoS_2$ or $Mo_3S_4$), cobalt-phosphate (e.g., Co-Pi oxygen evolution catalyst), cobalt oxide (e.g., $Co_3O_4$), cobalt phosphorus (e.g., CoP), iridium oxide (e.g., $IrO_2$), ruthenium oxide (e.g., $RuO_2$) and rhodium oxide (e.g., $Rh_2O_3$).

When the photoelectrode structure is a photocathode, the electrocatalyst 16 may include Pt, NiMo, NiMoZn, $MoS_2$, or $Mo_3S_4$ suitable for the proton reduction.

When the photoelectrode structure is a photoanode, a catalyst, e.g., Ir, $IrO_2$, Ru, $RuO_2$, $Co_3O_4$, or Co-Pi, suitable for oxidizing water may be used for the electrocatalyst 16.

The electrode 10 has a structure where a conductive layer is provided on a substrate.

The conductive layer includes at least one of a metal and an oxide conductor. The metal includes at least one selected from stainless steel, nickel, gold (Al), silver (Ag), and copper (Cu), and an alloy thereof, and the oxide conductor includes at least one selected from Fluorine doped Tin Oxide ("FTO", e.g., $SnO_2$:F), In-doped Indium Oxide ("ITO", e.g., $In_2O_3$:Sn), ZnO:Al, and $TiO_2$:Nb. In some embodiments, the conductive layer may have a light transmitting metal grid form.

The substrate may comprise a glass substrate or the like.

In some embodiments, the electrode may use an FTO-deposited glass substrate.

The bonding layer may be formed by using a metal solder material and a conductive material paste. The metal solder material may include at least one selected from Ag, AgSn, Sn, In, InSn, and InAg, and an alloy thereof, and the conductive material paste includes an Ag paste or a carbon paste.

The bonding layer 12 may include, for example, at least one selected from Ag, AgSn, Sn, In, InSn, and InAg, an alloy thereof, carbon, and a combination thereof.

Any material producing a hole or an electron by absorbing sunlight may be used for the light absorbing layer 11. For example, the material for the light absorbing layer 11 may be at least one selected from $Cu_2O$, $Cu(In, Ga)(S,Se)_2$, $Cu(Zn, Sn)(S,Se)_2$, Si, $WO_3$, $BiVO_4$, CdS, CdSe, CdTe, ZnSe, InGaN, AlGaN, GaAs, GaP, InGaP, and $ZnGeP_2$, capable of absorbing visible light.

Although not illustrated in FIG. 1A, a carrier blocking layer may be further disposed between the bonding layer 12 and the light absorbing layer 11.

The carrier blocking layer is a layer for selecting a direction of the excited electrons or the excited holes produced in the electrode and includes a hole blocking layer or an electron blocking layer.

The carrier blocking layer includes n-type wide band gap oxide or p-type wide band gap oxide.

The n-type wide band gap oxide includes at least one selected from ZnO, $TiO_2$, $Ta_2O_5$, and $Nb_2O_5$, and the p-type wide band gap oxide includes NiO.

When the photoelectrode structure is a photocathode structure, the n-type wide band gap oxide is used as a carrier blocking layer forming material. When the photoelectrode structure is a photoanode structure, the p-type wide band gap oxide may be used as the carrier blocking layer forming material.

When a semiconductor having a p-n junction as the light absorbing layer is used, the carrier blocking layer does not need to be formed.

In an embodiment, the carrier blocking layer includes ZnO or $TiO_2$.

Figure 1B:
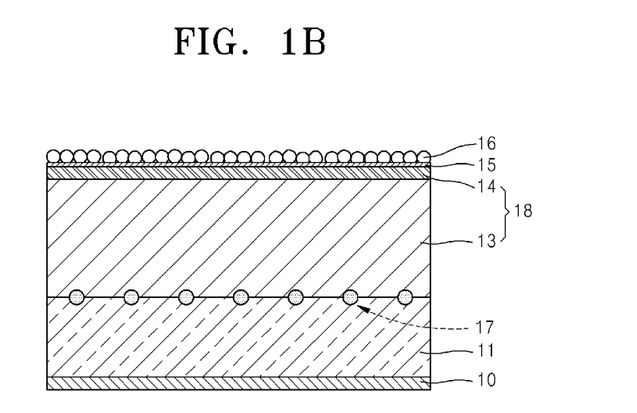
FIG. 1B is a cross-sectional view of another embodiment of a photoelectrode.

FIG. 1B is a cross-sectional view of another embodiment of a photoelectrode.

Unlike the photoelectrode structure of FIG. 1A, the photoelectrode structure of FIG. 1B does not include a bonding layer between the light absorbing layer 11 and the physical protective layer 13 and the photoelectrode structure of FIG. 1B includes a structure wherein the light absorbing layer 11 directly bonds to the physical protective layer 13 through welding points 17. The photoelectrode structure of FIG. 1B has the same structure as the photoelectrode structure of FIG. 1A, except that the welding points are formed in the photoelectrode structure of FIG. 1B.

Although not illustrated in FIG. 1B, when the light absorbing layer 11 includes a semiconductor material having the p-n junction, a bonding film for preventing penetration of water may be adhered to another surface of the electrode 10. A non-limiting example of the bonding film includes a polyimide film (for example, a Kapton tape).

A method of manufacturing the photoelectrode structure is as follows.

First, the light absorbing layer is formed on the electrode.

The light absorbing layer may be formed according to any method known in the art, for example, sputtering deposition, evaporation, electrodeposition, electroplating, electroless plating, chemical vapor deposition, atomic layer deposition, and the like.

The light absorbing layer may have a thickness of about 1 μm to about 30 μm.

After removing impurities from a surface of the light absorbing layer, the carrier blocking layer is optionally formed to thus form an electrode/light absorbing layer/carrier blocking layer structure. Here, the carrier blocking layer has a thickness of about 5 nm to about 100 nm.

The carrier blocking layer may be formed by using sputtering, deposition, or the like.

Removing the impurities from the surface of the light absorbing layer may include heating the light absorbing layer in vacuum condition at a temperature of about 350° C. to about 500° C. after removing organic materials by using hydrogen peroxide.

Separately, a composite protective layer including the physical protective layer and the chemical protective layer is prepared. A bonding layer/physical protective layer/chemical protective layer structure is manufactured by bonding the bonding layer to the physical protective layer of the composite protective layer.

A thickness of the bonding layer may be about 0.01 μm to about 10 μm.

The bonding layer is formed by using the metal solder material and the conductive material paste.

According to an embodiment, the bonding layer is formed by coating the conductive material paste on the physical protective layer, pressing and heating the same, or by inserting the metal solder material between the composite protective layer and the light absorbing layer, and pressing and heating the same.

The metal solder material includes at least one selected from Ag, AgSn, Sn, In, InSn, and InAg, and an alloy thereof, and the conductive paste includes a Ag paste and a carbon paste.

When bonding, a roll press or the like may be used.

By pressing the bonding layer of the bonding layer/physical protective layer/chemical protective layer structure and the carrier blocking layer of the electrode/light absorbing layer/carrier blocking layer structure, a photoelectrode structure of the electrode/light absorbing layer/carrier blocking layer/bonding layer/physical protective layer/chemical protective layer is obtained.

Disposing the electrocatalyst on the chemical protective layer of the photoelectrode structure is performed.

In an embodiment, deposition, sputtering or the like may be used in the disposing of the electrocatalyst.

In manufacturing the photoelectrode structure, the chemical protective layer may be formed by sputtering, deposition, electrostatic deposition, electroplating, electroless plating, chemical vapor deposition or atomic layer deposition of a material for forming the chemical protective layer.

Each layer of the photoelectrode structure may be formed by a low temperature manufacturing process at a temperature of 250° C. or less. According to an embodiment, the bonding layer may be formed at a temperature of about 200° C., and the physical protective layer, the chemical protective layer, and the electrocatalyst may all be formed at room temperature.

When forming the bonding layer, a process of heating and pressurizing the bonding layer at a temperature of 250° C. or less and in some embodiments at a temperature of about 200° C. to about 250° C., is performed.

When pressurizing, a range of pressure is about 0.1 kgf/cm$^2$ to about 10 kgf/cm$^2$. The process of heating and pressurizing may vary according to conditions of heating temperature and pressure; however, the process of heating and pressurizing may be performed for about 1 minute to about 20 minutes.

Without forming a bonding layer as illustrated the photoelectrode structure of FIG. 1B, the light absorbing layer may be directly bonded to the physical protective layer using laser bonding, arc melting, welding, or the like.

Each layer included in the photoelectrode structure may be formed at a low temperature as described above, and as a result, various materials regardless of chemical stability of a semiconductor may be used as a material for forming the light absorbing layer. For example, copper compounds such as $Cu_2O$, selenide-based materials, and non-oxide semiconductor materials such as Si, Ge, GaAs, InGaP, InGaN, TaON, CdS, and CIGS may be used as the material for forming the light absorbing layer. In this regard, various materials for the light absorbing layer may be used while using a low temperature manufacturing process and as a result, the photoelectrode structure may be manufactured at a low cost.

According to another aspect, there is provided a photoelectrochemical cell including the photoelectrode structure.

Figure 2:
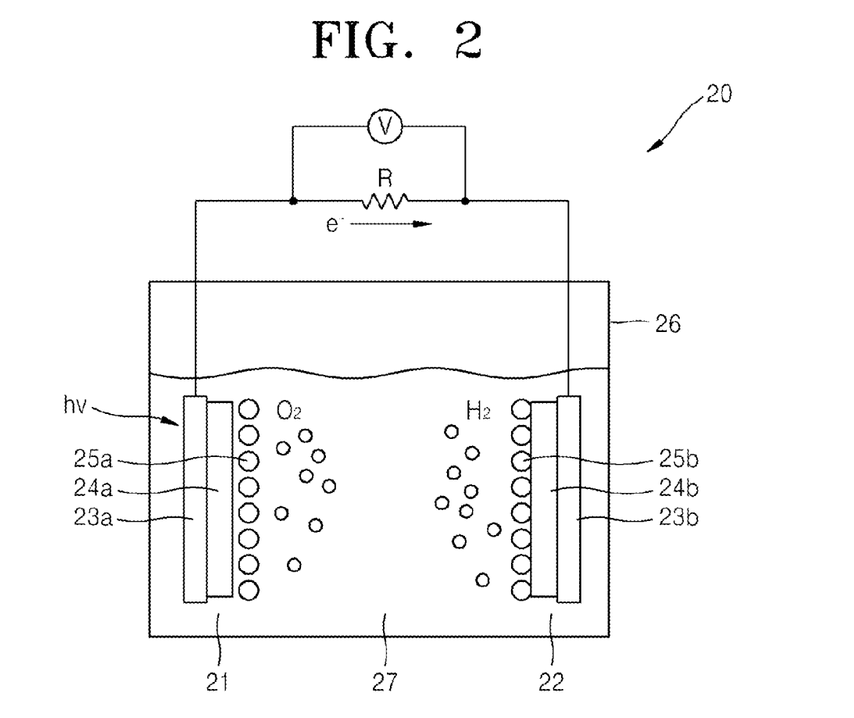
FIG. 2 illustrates an embodiment of a photoelectrochemical cell.

FIG. 2 illustrates an embodiment of a photoelectrochemical cell.

In FIG. 2, a photoelectrochemical cell 20 includes a chamber 26, a photoanode structure 21, a photocathode structure 22 and an electrolyte 27 in a non-limiting arrangement. Also, in an embodiment, the photoelectrochemical cell 20 may include a resistor.

The photoanode structure 21 and the photocathode structure 22 may each independently comprise the photoelectrode disclosed herein.

The photoanode structure 21 includes an electrode 23a, a light absorbing layer 24a, and an electrocatalyst 25a, and the photocathode structure 22 includes an electrode 23b, a light absorbing layer 24b, and an electrocatalyst 25b.

The electrocatalysts 25a and 25b are non-limiting examples and they are in the form of an electrocatalyst layer. An average thickness of the electrocatalyst layer may vary according to an amount of voltage applied to the electrode, length of time, types of the electrolyte, and surface areas of the electrode. The average thickness is not particularly limited and in some embodiments, the thickness may be about 10 nm to about 2000 nm.

Through the internal and external circuits of the light absorbing layers 24a and 24b, electrons are transported to the photoanode that is a reducing electrode and holes oxidize $OH^-$ ions included in the electrolyte to produce oxygen (Formula 3). Also, in the photocathode, that is a reducing electrode, $H^+$ is reduced to produce hydrogen (Formula 4).

$$H_2O + 2h^+ \rightarrow 2H^+ + \tfrac{1}{2}O_2 \quad \text{Formula 3}$$

$$2H^+ + 2e^- \rightarrow H_2 \quad \text{Formula 4}$$

Hereinafter, this disclosure is further exemplified using the Examples below; however, the present inventive concept is not limited to the Examples below.

Example 1

Manufacturing a Photoelectrode Structure

An FTO film formed on a glass substrate was used as an electrode. On the FTO film, $Cu_2O$ was deposited to form a light absorbing layer having a thickness of about 5 μm. After the light absorbing layer was treated with hydrogen peroxide to remove organic material on a surface of the light absorbing layer, the light absorbing layer was heat treated at a temperature of about 450° C. for about 30 minutes under a vacuum condition.

On the light absorbing layer, a hole blocking layer having a thickness of about 70 nm was formed by sputtering $TiO_2$ and thus an FTO film (hereinafter, an FTO glass film)/a $Cu_2O$ film/a $TiO_2$ structure formed on the glass substrate was manufactured.

Separately, on a Cu foil physical protective layer having a thickness of about 20 μm, Ta was deposited to form a Ta chemical protective layer having a thickness of about 100 nm, to thereby form a composite protective layer (Ta thin film chemical protective layer/Cu foil physical protective layer).

An In foil, that is a bonding layer, was bonded to the Cu foil of the Ta thin film/Cu foil composite protective layer using a roll press to form a bonded structure, and the bonded structure was bonded to $TiO_2$ of the FTO glass film/$Cu_2O$ film/$TiO_2$ structure and pressed at a temperature of about 200° C. to manufacture a FTO glass film $Cu_2O$ film/$TiO_2$ film/In layer/Cu foil/Ta thin film structure.

Figure 3A:
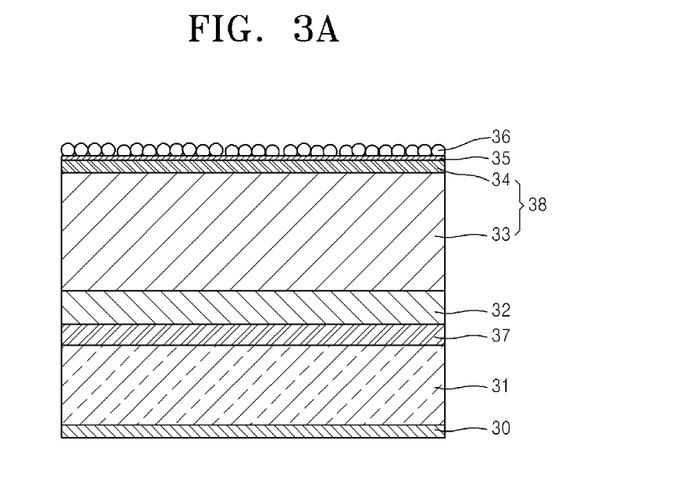
FIGS. 3A and 3B illustrate cross-sectional views of a photocathode structure manufactured according to Example 1 and Comparative Example 1, respectively.

On the Ta thin film of the FTO glass film/$Cu_2O$ film/$TiO_2$ film/In layer/Cu foil/Ta thin film structure, Pt nanoparticles were deposited as a proton reducing catalyst, to manufacture a photoelectrode structure (a photocathode structure) as illustrated in FIG. 3A including the FTO glass film 30/$Cu_2O$ film 31/$TiO_2$ film 37/In layer 32/Cu foil 33/Ta layer 34/Ta native oxide film (a thickness of about 8 nm) 35/Pt film 36. Reference number 38 of FIG. 3A represents a composite protective layer.

Example 2

Manufacturing a Photoelectrode Structure (a Photoanode)

A composite protective layer was formed by laminating a Ta film where Ta is deposited in a thickness of 100 nm and a Cu foil having a thickness of 20 μm. A Cu foil of the composite protective layer was bonded to an In foil using a roll press, and a structure of In layer/Cu foil/Ta thin film/Ta native oxide film was obtained.

The In layer of the In layer/Cu foil/Ta thin film/Ta structure was bonded to a p-type silicon layer of the light absorbing layer wherein an n-type silicon layer and the p-type silicon layer are sequentially laminated, and pressurized at a temperature of about 200° C. to form a structure including an n-type silicon layer/p-type silicon layer/In layer/Cu foil/Ta thin film/Ta native oxide film.

On a Ta native oxide film of the n-type silicon layer/p-type silicon layer/In layer/Cu foil/Ta thin film/Ta native oxide film structure, a $Co_3O_4$ catalyst was deposited to form a $Co_3O_4$ layer to form an n-type silicon layer/p-type silicon layer/In layer/Cu foil/Ta thin film/Ta native oxide film/$Co_3O_4$ structure.

Figure 5A:
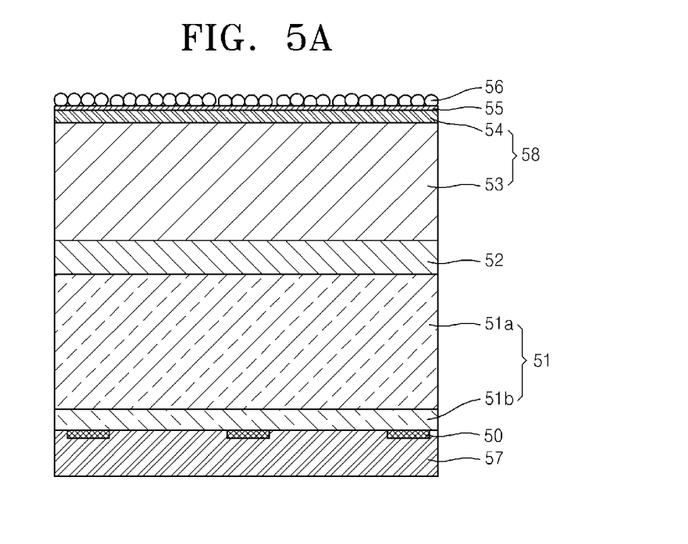
FIGS. 5A and 5B illustrate cross-sectional views of a photoanode structure manufactured according to Example 2 and Comparative Example 2, respectively.

On another surface of the n-type silicon layer of the structure, a silver grid electrode was formed and Kapton tape was adhered on the silver grid electrode to form a photoelectrode structure (a photoanode structure) including a Kapton tape layer 57/silver grid electrode 50/n-type silicon layer 51*b*/p-type silicon layer 51*a*/In layer 52/Cu foil 53/Ta thin film 54/Ta native oxide film 55/$Co_3O_4$ layer 56. Reference number 51 of FIG. 5A represents the light absorbing layer.

Comparative Example 1

Manufacturing a Photoelectrode Structure

An FTO film formed on a glass substrate was used as an electrode. On the FTO film, $Cu_2O$ was deposited to form a light absorbing layer having a thickness of about 5 μm. The light absorbing layer was treated with hydrogen peroxide to remove organic material from a surface of the light absorbing layer, and the light absorbing layer was heat treated at a temperature of about 450° C. for about 30 minutes under a vacuum condition to form a FTO glass film/$Cu_2O$ film structure.

On the $Cu_2O$ film of the FTO glass film/$Cu_2O$ film structure, a hole blocking layer having a thickness of about 70 nm was formed by sputtering $TiO_2$ to form an FTO glass film/$Cu_2O$ film/$TiO_2$ film structure.

Figure 3B:
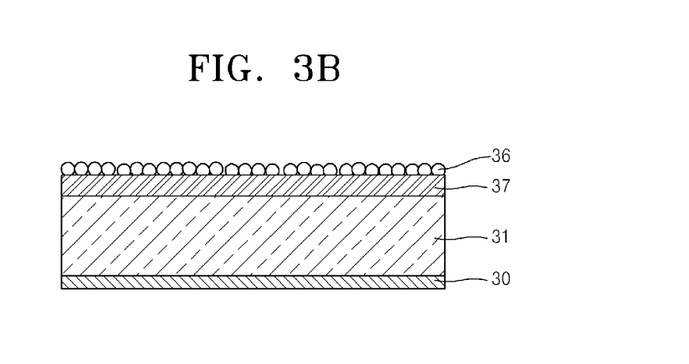

On the $TiO_2$ film of the FTO glass film/$Cu_2O$ film/$TiO_2$ film structure, Pt nanoparticles were deposited to manufacture a photoelectrode structure (a photocathode structure) including the FTO glass film 30/$Cu_2O$ film 31/$TiO_2$ film 37/Pt film 36 of FIG. 3B.

Comparative Example 2

Photoelectrode Structure

An n-type silicon layer and a p-type silicon layer were sequentially laminated to manufacture a light absorbing layer and a $Co_3O_4$ was deposited on the p-type silicon layer of the manufactured light absorbing layer to form a $Co_3O_4$ layer to thereby manufacture an n-type silicon layer/p-type silicon layer/$Co_3O_4$ layer structure.

Figure 5B:
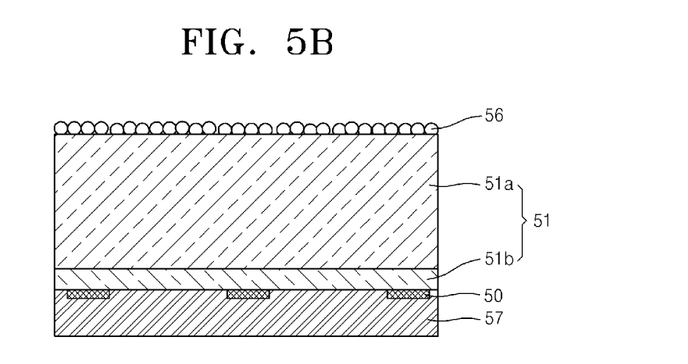

On another surface of the n-type silicon layer of the n-type silicon layer/p-type silicon layer/$Co_3O_4$ layer structure, a silver grid electrode was formed and a Kapton tape was adhered on the silver grid electrode to manufacture a photoelectrode structure (photoanode) including a Kapton tape layer 57/silver grid electrode 50/n-type silicon layer 51*b*/p-type silicon layer 51*a*/$Co_3O_4$ layer 56 of FIG. 5B. Reference number 51 of FIG. 5B represents a light absorbing layer.

Evaluation Example 1

Measuring Photocorrosion

1) Photocathode Structures of Example 1 and Comparative Example 1

Figure 4A:
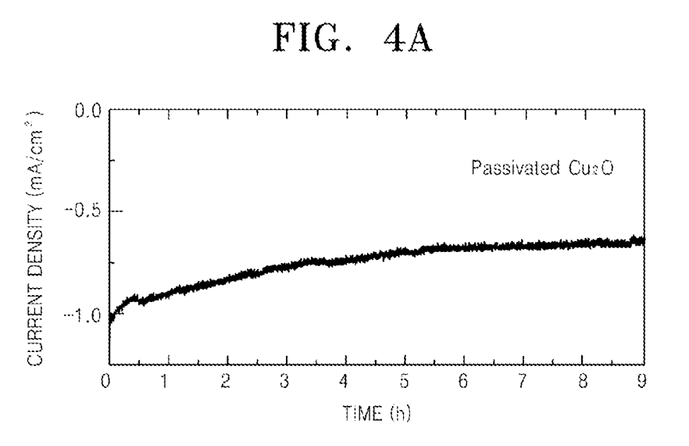
FIGS. 4A and 4B are each a graph of current density (milliamperes per square centimeter, $mA/cm^2$) versus time (hours) and illustrate changes in a current density over time of a photocathode structure manufactured according to Example 1 and Comparative Example 1, respectively.
Figure 4B:
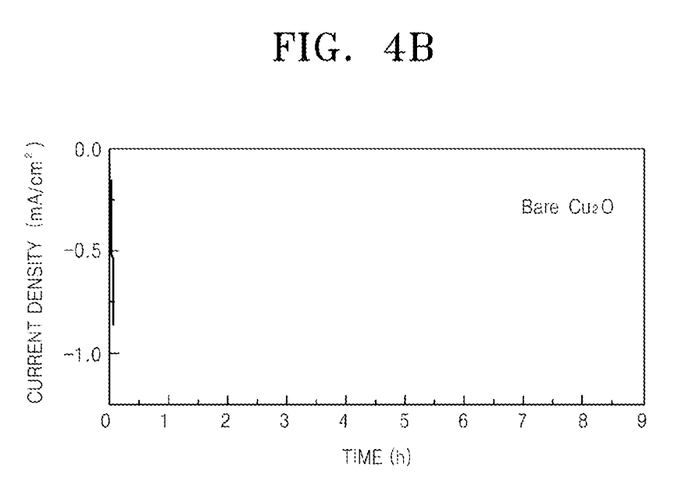

With respect to the photocathode structures prepared according to Example 1 and Comparative Example 1, changes in a photocurrent over time of the photocathode structure were measured every 20 seconds by using a 1.5 light source of amplitude modulation ("AM"), and results are shown in FIGS. 4A and 4B.

In FIG. 4A, the photocathode structure of Example 1 showed reduction in current density to about 60% of an initial current density after about 9 hours whereas the photocathode structure of Comparative Example 1 showed a dramatic reduction in current density within one minute. While not wanting to be bound by theory, it is understood that the dramatic reduction in current density occurred because copper oxide was self-reduced to copper as represented in Formula 5.

$$Cu_2O + H_2O + 2e^- \rightarrow 2Cu + 2OH^- \quad \text{Formula 5}$$

In this regard, the photocathode structure of Example 1 did not show reduction in current density caused by photocorrosion when compared to the photocathode structure of Comparative Example 1.

1) Photoanode Structures of Example 2 and Comparative Example 2

Figure 6A:
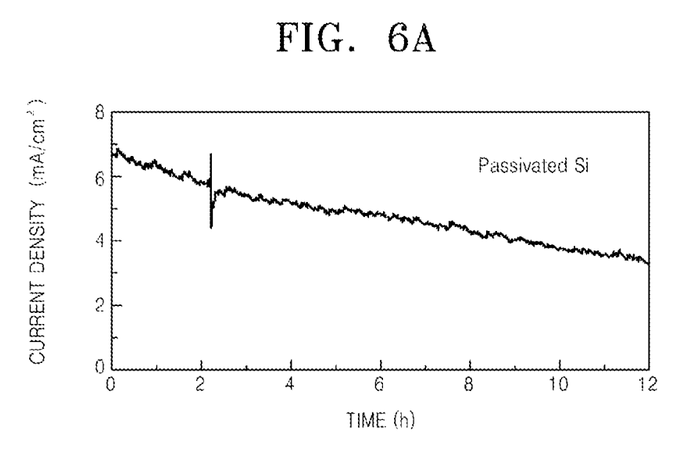
FIGS. 6A and 6B are each a graph of current density (milliamperes per square centimeter, $mA/cm^2$) versus time (hours) and illustrate changes in a current density over time of a photoanode structure manufactured according to Example 1 and Comparative Example 1.
Figure 6B:
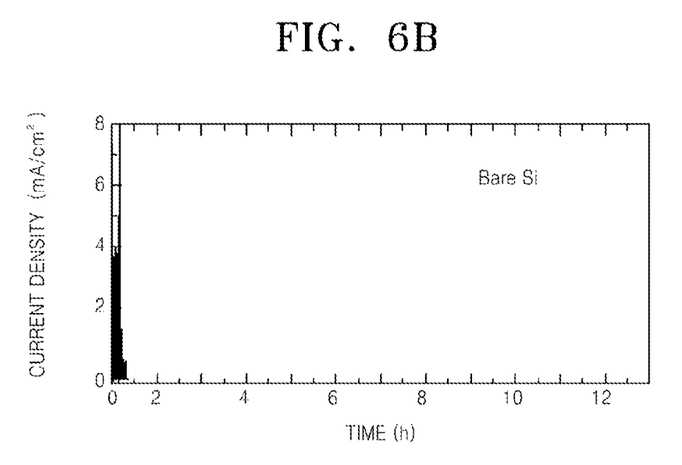

With respect to the photoanode structures prepared according to Example 2 and Comparative Example 2, changes in a photocurrent for each photocathode structure was measured at every interval of about 20 seconds by using a 1.5 light source of amplitude modulation ("AM"), and results are shown in FIGS. 6A and 6B.

In FIG. 6B, the photocathode structure of Comparative Example 2 showed reduction in current density to about 50% of an initial current density after about 3 minutes and as a result, and while not wanting to be bound by theory, it is understood that it may be inferred that self-oxidation reaction occurred on a surface of silicon according Formula 6.

$$Si + 2H_2O + 4h^+ \rightarrow SiO_2 + 4H^+ \quad \text{Formula 6}$$

Meanwhile, in FIG. 6A, the photocathode structure of Example 2 showed reduction in current density to about 50% of the initial current density after 12 hours. In this regard, the photoanode of Example 2 did not show reduction in current density caused by photocorrosion when compared to the photoanode structure of Comparative Example 2.

Evaluation Example 2

Measuring Operational Stability

An operational stability of the photoanode structures manufactured according to Example 2 and Comparative Example 2 were measured as follows.

As a device for measuring the operation stability of the photoanode structure, a 3-electrode cell filled with an aqueous buffered electrolyte was used.

As a working electrode, the photoanode structures manufactured in Example 2 and Comparative Example 2 were used, and as a reference electrode, Ag/AgCl (3M NaCl) was used, and as a counter electrode, a Pt gauze was used, and as the aqueous buffered electrolyte, a mixture of 0.1 M of a KPi aqueous solution (hence, an aqueous solution of $K_2HPO_4$ and $KH_2PO_4$ at a suitable ratio such that a total concentration of phosphate ions is 0.1 M while acidity is pH 7) and potassium hydroxide was used. The operation stability of each electrode was evaluated by changing the pH of the aqueous buffered electrolyte to a pH of 7 or to a pH of 11.4.

Figure 7A:
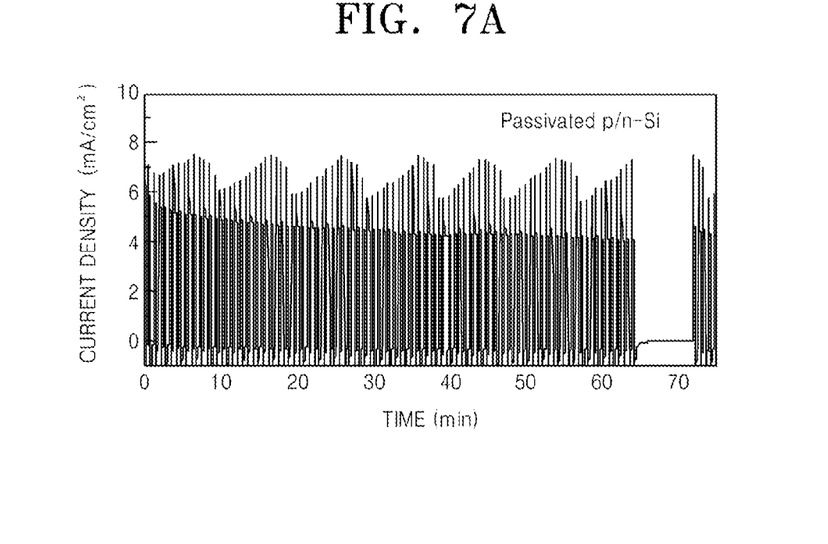
FIGS. 7A and 7B are each a graph of current density (milliamperes per square centimeter, $mA/cm^2$) versus time (minutes) and illustrate results of an evaluation of stability of a photoanode structure manufactured according to Example 2 and Comparative Example 2, respectively, using an aqueous buffered electrolyte having a pH of about 7.
Figure 7B:
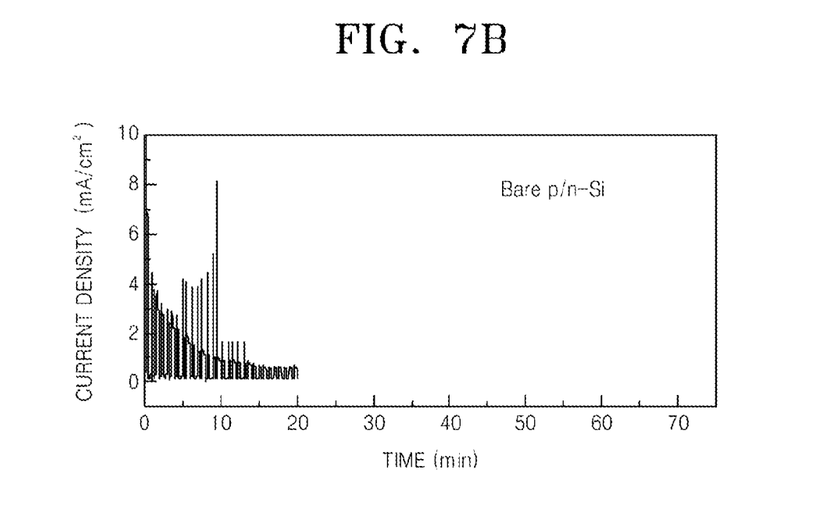

FIGS. 7A and 7B illustrate results of an evaluation of operation stability of the photoanode structure manufactured according to Example 2 and Comparative Example 2, respectively, using the aqueous buffered electrolyte having a pH of about 7.

Figure 8A:
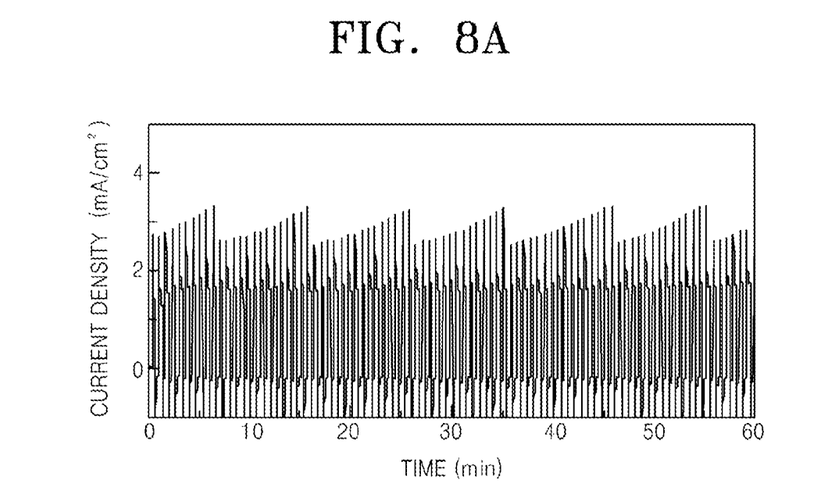
FIGS. 8A and 8B are each a graph of current density (milliamperes per square centimeter, $mA/cm^2$) versus time (minutes) and illustrate results of an evaluation of stability of a photoanode structure manufactured according to Example 2 and Comparative Example 2, respectively, using an aqueous buffered electrolyte having a pH of about 11.4.
Figure 8B:
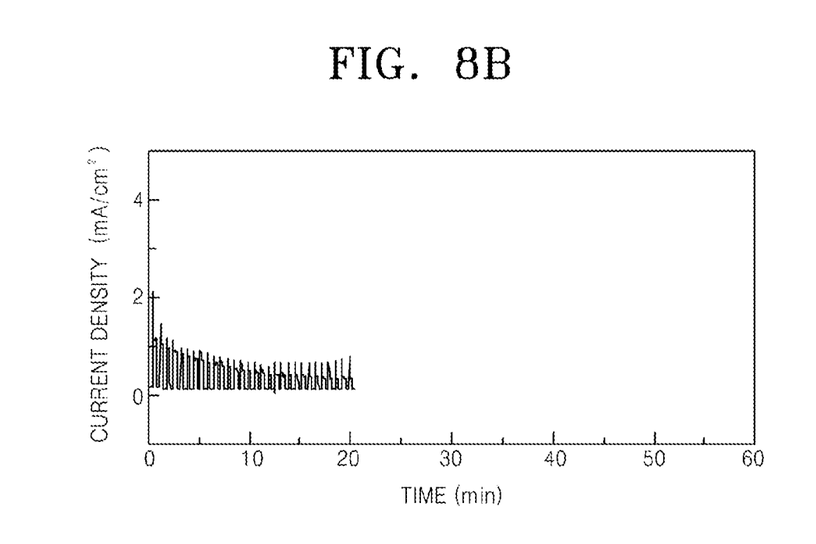

FIGS. 8A and 8B illustrate results of an evaluation of stability of the photoanode structure manufactured according to Example 2 and Comparative Example 2, respectively, using the aqueous buffered electrolyte having a pH of about 11.4.

In FIGS. 7A to 8B, the photoanode of Example 2 showed excellent stability after about 60 minutes regardless of pH. However, the photoanode structure of Comparative Example 2 showed a substantial reduction in photocurrent at a pH 7 and pH 11.4 due to reduced activity of an electrocatalyst. In this regard, the photoanode structure manufactured according to Example 2 showed excellent stability regardless of pH when compared to the photoanode structure of Comparative Example 2.

Evaluation Example 3

Measuring Quantity of Corrosion Electrical Charge Per Unit of Time

With respect to the photoelectrode structure manufactured according to Examples 1 and 2, a quantity of corrosion electrical charges per unit of time of a Ta thin film, that is a chemical protective layer, was evaluated by the following method, and results are shown in Table 1. In Table 1 below, an aluminum thin film and a copper thin film having the same thickness as the Ta thin film were shown to evaluate the quantity of corrosion electrical charges per unit of time of the photoelectrode structure of Examples 1 and 2.

The quantity of corrosion electrical charges per unit of time of the Ta thin film was evaluated by measuring an amount of current over a time of 10 hours at a potential of 1.23 V vs. RHE using a Potentionstat.

A potentiostat (VersaSTAT 3) available from Princeton Applied Research ("PAR") was used as the Potentiostat device.

TABLE 1

| | Amount of corrosion: electrical charges per unit area (C/cm$^2$) |
|---|---|
| Example 1 | 0.025 |
| Example 2 | 0.02 |
| Aluminum thin film | 15 |
| Copper thin film | 1.24 |

As shown in Table 1, the Ta thin film used as the chemical protective layer in the photoelectrode structures of Examples 1 and 2, showed a very small quantity of corrosion, 0.1 C/cm$^2$ or less, when compared to those of the aluminum thin film and the copper thin film. As shown above, the photoelectrode structures of Examples 1-2 show excellent resistance with respect to corrosion compared to an aluminum thin film and a copper thin film due to a decrease in corrosion electrical charge.

Evaluation Example 4

Measuring Moisture Transmittance

With respect to the photoelectrode structures manufactured according to Examples 1 and 2, a moisture transmittance of a Cu foil, that is a physical protective layer, was measured and results are shown in Table 2.

The moisture transmittance of the Cu foil was evaluated using a water vapor permeability test. A device operated by an electrolytic sensor method based on ISO 15106-3 was used as a device for measuring the water vapor permeability test.

TABLE 2

| | Moisture transmittance (g/m$^2$/day) |
|---|---|
| Example 1 | <0.001 |
| Example 2 | <0.001 |

As shown in Table 2, the copper foil used as the physical protective layer in the photoelectrode structures of Examples 1 and 2 has a moisture transmittance of 0.001 grams per square-meter per day (g/m$^2$/day) or less, which is a limit of measurement of the device for measuring the water vapor permeability test.

Evaluation Example 5

Measuring Conductivity at Room Temperature

With respect to the photoelectrode structures manufactured according to Examples 1 and 2, a conductivity at room temperature of the Cu foil, that is a physical protective layer, was evaluated according to the method below and results are shown in Table 3.

An electrical conductivity of the Cu foil may be obtained by contacting probe tips of a device for measuring the electrical conductivity on both ends of a Cu foil having a thickness of about 20 μm, measuring a current density-voltage (I-V) characteristic and measuring a slope of an I-V curve.

TABLE 3

| | Conductivity at room temperature (S/cm) |
|---|---|
| Example 1 | $8.0 \times 10^8$ |
| Example 2 | $8.5 \times 10^8$ |

As illustrated in Table 3, the copper foil used as the physical protective layer in the photoelectrode structures of Examples 1 and 2 has excellent conductivity at room temperature of $1 \times 10^6$ S/cm or greater.

The composite protective layer for the photoelectrode structure according to an embodiment protects the photoelectrode structure from photocorrosion and improves the lifespan of the photoelectrode structure. By using the photoelectrode structure, a photoelectrochemical cell having improved efficiency and improved lifespan may be manufactured.

It should be understood that the exemplary embodiments described herein shall be considered in a descriptive sense only and not for purposes of limitation. Descriptions of features, advantages or aspects within each embodiment shall be considered as available for other similar features, advantages, or aspects in other embodiments.

What is claimed is:
1. A composite protective layer for a photoelectrode structure, the composite protective layer comprising:
a chemical protective layer, wherein the chemical protective layer is a metal and comprises at least one metal selected from Group 4, Group 5, Group 11, Group 13, and Group 14 of the Periodic Table of the Elements, and an alloy thereof; and a physical protective layer, wherein the physical protective layer comprises carbon or a metal comprising at least one selected from at least one metal selected from Group 5, Group 11, and Group 13, an alloy thereof, and stainless steel, wherein the chemical protective layer has a corrosion rate of 0.1 Coulombs per square centimeter per 10 hours or less when evaluated at a water decomposition potential, and wherein the physical protective layer has moisture transmittance rate of 0.001 grams per square meter per day or less and has an electrical conductivity, wherein the chemical protective layer comprises at least one metal selected from tantalum, niobium, titanium, gallium, zirconium, copper, hafnium, aluminum, and indium, and an alloy thereof, and the metal of the physical protective layer comprises at least one selected from copper, stainless steel, tantalum, niobium, and titanium, an alloy thereof, and stainless steel.

2. The composite protective layer for the photoelectrode structure of claim 1, wherein electrical conductivity of the physical protective layer at room temperature is $1 \times 10^6$ Siemens per centimeter or greater.

3. The composite protective layer for the photoelectrode structure of claim 1, wherein the chemical protective layer comprises a material that is insoluble in water having a pH of about 1 to about 12 at the water decomposition potential.

4. The composite protective layer for the photoelectrode structure of claim 1, wherein the chemical protective layer comprises at least one selected from tantalum, niobium, and titanium, and an alloy thereof.

5. The composite protective layer for the photoelectrode structure of claim 1, wherein the carbon comprises at least one selected from amorphous carbon, graphite, and graphene.

6. The composite protective layer for the photoelectrode structure of claim 1, wherein the physical protective layer is a free standing foil or a free standing film.

7. The composite protective layer for the photoelectrode structure of claim 1, wherein the protective layer further comprises a native oxide film of the chemical protective layer, and a thickness of the native oxide film is 10 nanometers or less.

8. The composite protective layer for the photoelectrode structure of claim 1, wherein the composite protective layer comprises a copper foil and a tantalum thin film, or the composite protective layer further comprises a native oxide film of the chemical protective layer and the composite protective layer comprises a copper foil, a tantalum thin film, and a native oxide film of the tantalum thin film.

9. A photoelectrode structure, comprising:
an electrode;
a light absorbing layer;
a composite protective layer; and
an electrocatalyst,
wherein the composite protective layer comprises:
a chemical protective layer, wherein the chemical protective layer is a metal and comprises at least one metal selected from Group 4, Group 5, Group 11, Group 13, and Group 14 of the Periodic Table of the Elements, and an alloy thereof, and
a physical protective layer, wherein the physical protective layer comprises carbon or a metal comprising at least one selected from at least one metal selected from Group 5 and Group 13, an alloy thereof, and stainless steel, wherein the chemical protective layer has a corrosion rate of 0.1 Coulombs per square centimeter per 10 hours or less when evaluated at a water decomposition potential, and wherein the physical protective layer has moisture transmittance rate of 0.001 grams per square meter per day or less and is electrically conductive wherein the chemical protective layer comprises at least one metal selected from tantalum, niobium, titanium, gallium, zirconium, copper, hafnium, aluminum, and indium, and an alloy thereof, and the metal of the physical protective layer comprises at least one selected from copper, stainless steel, tantalum, niobium, and titanium, an alloy thereof, and stainless steel.

10. The photoelectrode structure of claim 9, further comprising a bonding layer between the light absorbing layer and the composite protective layer.

11. The photoelectrode structure of claim 10, further comprising a carrier blocking layer between the light absorbing layer and the bonding layer.

12. The photoelectrode structure of claim 9, wherein the light absorbing layer is directly on a physical protective layer of the composite protective layer.

13. The photoelectrode structure of claim 9, wherein the light absorbing layer comprises at least one selected from $Cu_2O$, $Cu(In,Ga)(S,Se)_2$, $Cu(Zn,Sn)(S,Se)_2$, Si, $WO_3$, $BiVO_4$, CdS, CdSe, CdTe, ZnSe, InGaN, AlGaN, GaAs, GaP, InGaP, and $ZnGeP_2$.

14. The photoelectrode structure of claim 9, further comprising a native oxide film of the chemical protective layer between the composite protective layer and the electrocatalyst, wherein a thickness of the native oxide film is 10 nm or less.

15. The photoelectrode structure of claim 12, wherein the photoelectrode comprises an electrode/$Cu_2O$ layer/$TiO_2$ layer/In layer/Cu foil/Ta thin film/Ta native oxide film/electrocatalyst structure, or an electrode/n-type silicon/p-type silicon/In layer/Cu foil/Ta thin film/Ta native oxide film/electrocatalyst structure.

16. A photoelectrochemical cell comprising the photoelectrode structure of claim 9.

17. The photoelectrode structure of claim 9, wherein an electrical conductivity of the physical protective layer at room temperature is $1 \times 10^6$ Siemens per centimeter or greater.

18. The photoelectrode structure of claim 9, wherein the carbon comprises at least one selected from amorphous carbon, graphite, and graphene.

19. The photoelectrode structure of claim 9, wherein the composite protective layer comprises a copper foil and a tantalum thin film, or the composite protective layer further comprises a native oxide film of the chemical protective layer and the composite protective layer comprises a copper foil, a tantalum thin film, and a native oxide film of the tantalum thin film.

20. A photoelectrode structure, comprising:
an electrode;
a light absorbing layer;
a composite protective layer, wherein the composite protective layer comprises a chemical protective layer, wherein the chemical protective layer is a metal and comprises at least one metal selected from Group 4, Group 5, Group 11, Group 13, and Group 14 of the Periodic Table of the Elements, and an alloy thereof;
an electrocatalyst; and
a physical protective layer, wherein the physical protective layer has a thickness of 1 micrometer to 100 micrometers, the physical protective layer comprises carbon or a metal comprising at least one selected from at least one metal selected from Group 5, Group 11, and Group 13, an alloy thereof, and stainless steel, and is electrically conductive, and
wherein the chemical protective layer has a corrosion rate of 0.1 Coulombs per square centimeter per 10 hours or less when evaluated at a water decomposition potential,
wherein the physical protective layer has moisture transmittance rate of 0.001 grams per square meter per day or less,
wherein the chemical protective layer has a thickness of $\frac{1}{100}$th to $\frac{1}{10}$th of a thickness of the physical protective layer, and
wherein the chemical protective layer comprises at least one metal selected from tantalum, niobium, titanium, gallium, zirconium, copper, hafnium, aluminum, and indium, and an alloy thereof, and the metal of the physical protective layer comprises at least one selected from copper, stainless steel, tantalum, niobium, and titanium, an alloy thereof, and stainless steel.

\* \* \* \* \*